July 7, 1959 K. F. SCHLICHTING 2,893,052
TOOL AND GUIDE CONTROL APPARATUS FOR FISH DRESSING MACHINES
Filed Aug. 8, 1956 3 Sheets-Sheet 1

INVENTOR.
K. F. Schlichting
BY
Richards & Geier
ATTORNEYS

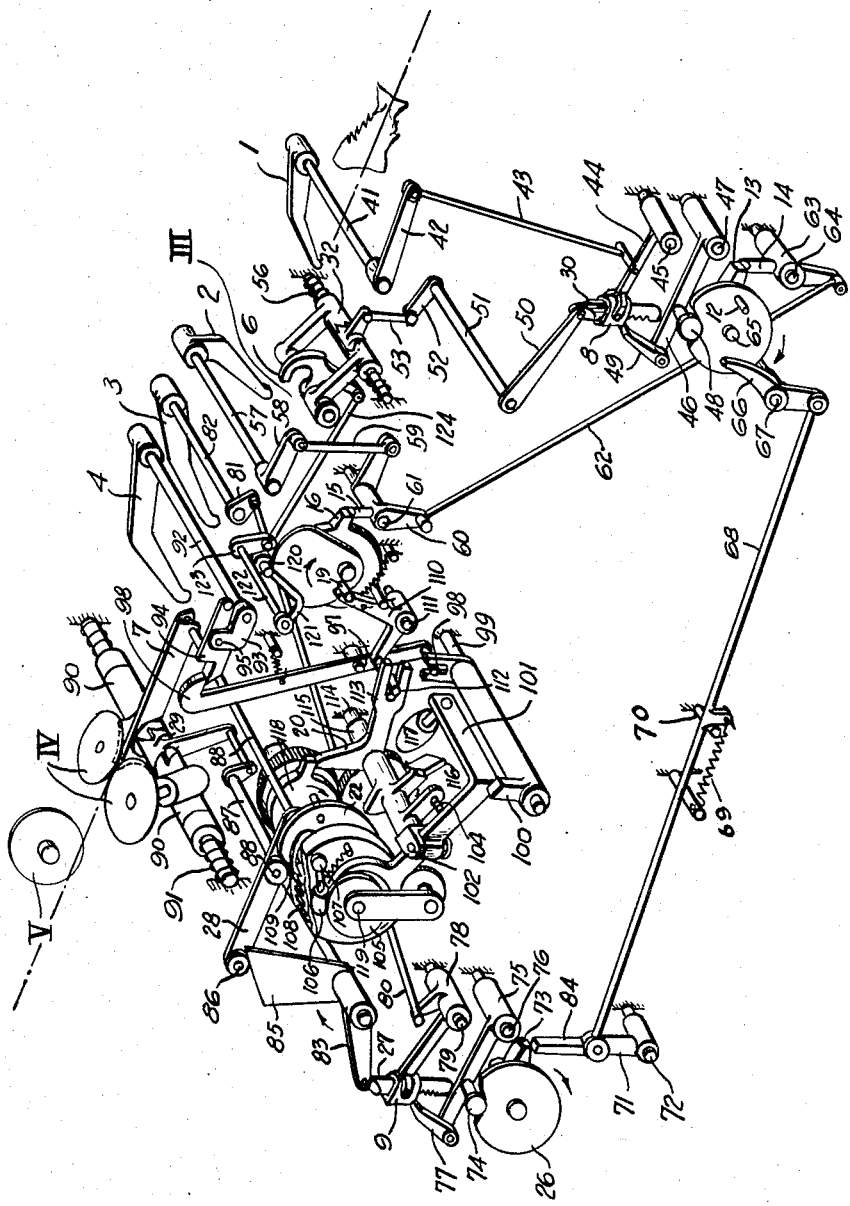

United States Patent Office 2,893,052
Patented July 7, 1959

2,893,052

TOOL AND GUIDE CONTROL APPARATUS FOR FISH DRESSING MACHINES

Karl Friedrich Schlichting, Lubeck, Germany, assignor to Nordischer Maschinenbau Rud. Baader, Lubeck, Germany Application August 8, 1956, Serial No. 602,719

Claims priority, application Germany August 10, 1955

7 Claims. (Cl. 17—3)

The invention relates to a method for controlling the tools and guides of fish dressing machines and is characterized in that the controlling operations are divided according to time and path of travel in such a manner that the fish themselves determine with part of their body the timing of the tools and guides, whereas the control paths of the tools and guides are determined by the size of the fish and their shape, by measurement.

In the mechanical dressing of fish, the main difficulty is the perfect control of the tools and guides, on which the output of the machine and the quality of the product depend. Generally speaking, the control of the tools and guides has to perform two functions, namely to regulate the time of engagement and disengagement of each tool and guide, and also to determine according to the kind and size of the fish, the path of each tool and guide while the tools are in operation. Hitherto the entire control was carried out uniformly by measuring the sizes of the fish, whereby either a measurement was taken as the fish enter the machine or a separate measurement was taken for each tool. A determining factor for the uniform control of time and control paths was that the construction of the machine must not be made too complicated by too many measuring and controlling devices. It has, however, been found that uniform regulation of all controlling operations in any case leads to such a complicated design of the measuring and controlling devices that the advantage which it was hoped to obtain by uniform regulation of all controlling operations was illusory, and moreover the output of the machine and the quality of the product obtained suffered accordingly.

An object of the present invention is to eliminate these drawbacks of prior art constructions.

It has now been discovered that it is possible with separate regulation of the controlling operations according to time and path to obtain a considerably simplified design of the machine, a good working efficiency and an excellent finished product, if with this separate regulation, the control of the time is, according to the invention, entrusted to a part of the body of the fish and only the control paths of the tools and guides are determined by the size of the fish by measurement. It can easily be seen that by this solution of the whole problem of control, the necessity of having to use complicated measuring and controlling devices for the time values no longer exists and as a result the design of the measuring and controlling devices for the control paths is very considerably simplified and consequently the operation is greatly improved.

In addition to the above mentioned advantages, there is another possibility, the importance of which should not be underestimated, particularly as regards the efficiency of the machine. In most of the known fish dressing machines the fish run through the working process at fixed distances apart determined by grippers or carriers. The result is that the working capacity of the machine is dependent upon every carrier being loaded. If some carriers run light or unloaded, which can easily happen when feeding by hand and even also in the case of mechanical feeding, the output of the machine drops because each fish which is missing from a carrier is taken by the next carrier, so that the preceding carrier runs empty. The working capacity of the machine is, however, calculated solely by the number of carriers passing the tools in a unit of time. If, however, the control of the time values is, according to the invention, effected by parts of the body of the fish, it is no longer necessary to adhere to the uniform spacing of the fish, that is, carriers can be dispensed with and the fish can be allowed to run through the machine at different distances apart. If a fish does not come into the machine at the normal distance from the preceding fish, it can nevertheless be introduced immediately into the dressing process. The control of the times for the engagement of the tools and guides is then advantageously governed by a part of the end of the fish pointing forward in the direction of travel.

In carrying out the process, the measurement of the time values can be effected by a part of the body of the fish separately for each tool or simultaneously for a number of tools. The time for cutting out the control can be determined by any part of the body of the fish, but this function should preferably be entrusted to a part of the running off end of the fish.

The control paths are dependent upon the width or height measurement of the fish or possibly upon both measurements. They might also, if desired, be determined by the running off part of the fish alone or derived from the width or height measurement as well as a measurement value determined by the running off part of the fish. The elements picking up the measurements, for example feelers, may serve at the same time as guides. The measuring elements, when they are to act as guides, are preferably additionally loaded so as to obtain the necessary guiding pressure.

The engagement of the tool by the part of the fish pointing in the direction of movement can advantageously be effected by swinging out a guide covering the tool. Likewise the disengagement of the tool can be effected by covering it with the aid of a guide serving as cutting support when the tool is in operation, the guide being actuated by the running out part of the fish.

In order to explain more clearly the basic improvement of the method according to the invention, this method is illustrated in the drawings as applied to a filleting machine, but the method can be used fundamentally on any other machine.

In the drawings:

Fig. 3 is a perspective view of the tools, feeler devices and controls.

Figure 1:
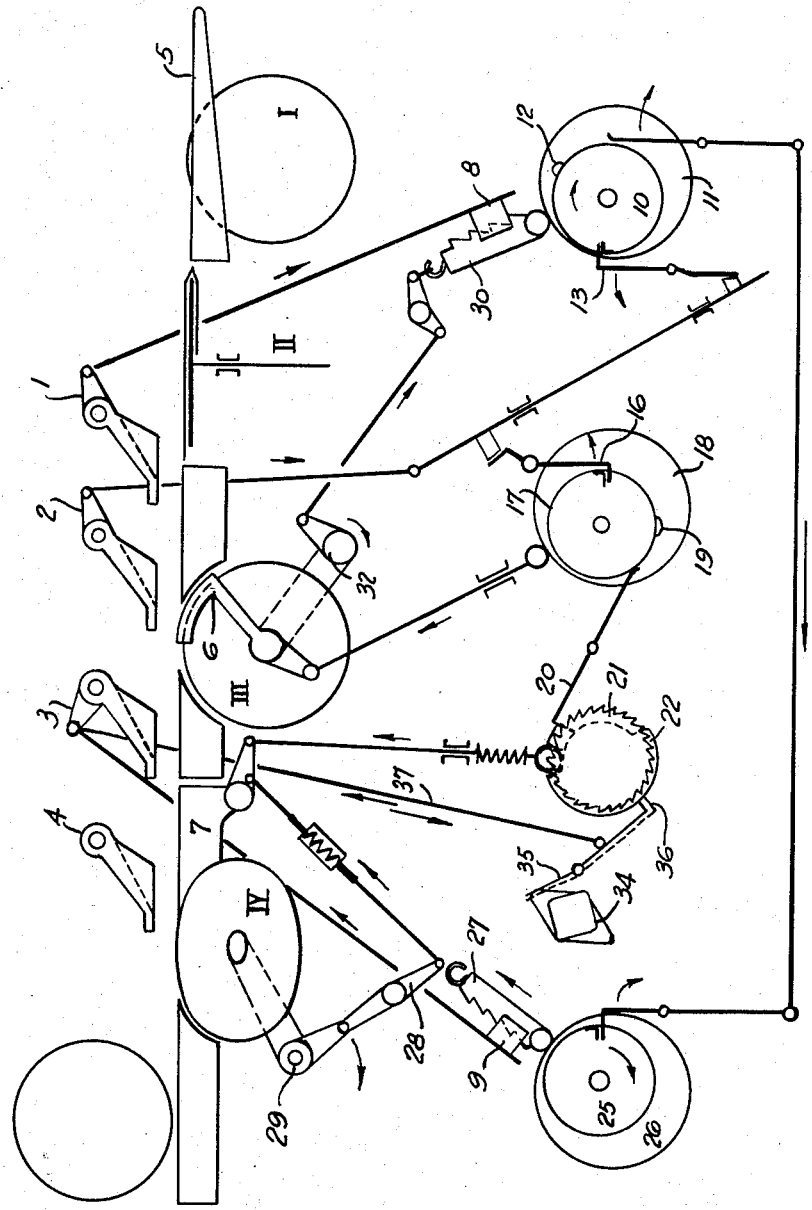
Fig. 1 shows the diagrammatic arrangement of the control of the guides and tools.
Figure 2:
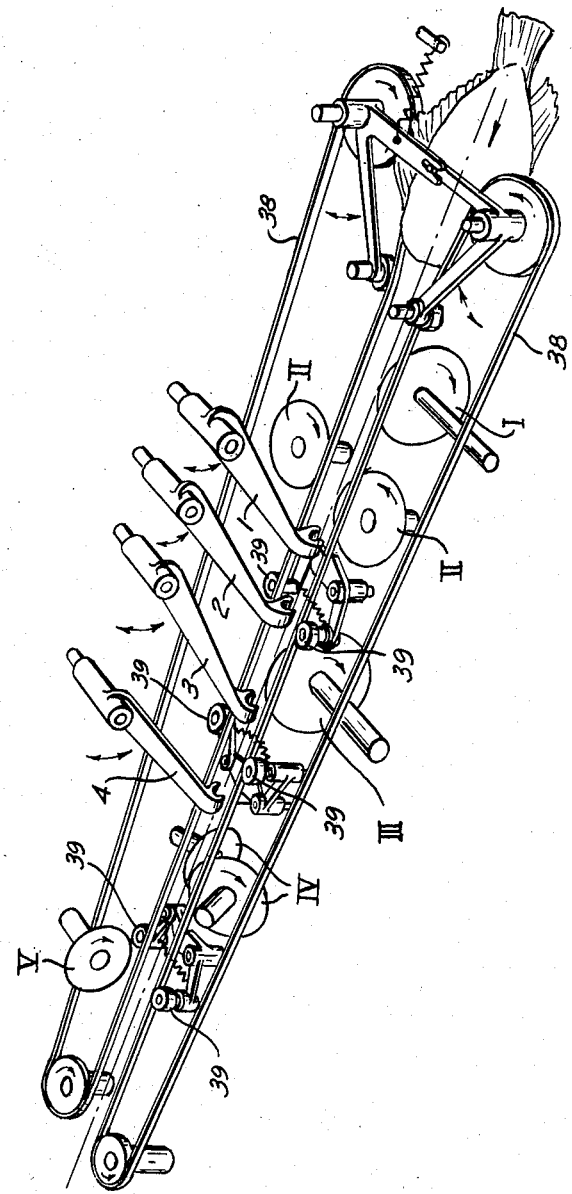
Fig. 2 is a perspective view of the tools and conveyor means which carry the fish through the machine.

The machine illustrated is equipped with tools, as can be seen from Figs. 1 and 2, comprising a belly opener I consisting of a circular knife, a belly flap cutter II consisting of at least one circular knife, a bone cutter III consisting of two parallel circular knives for cutting clear on both sides beside the backbone from the belly cavity to the root of the tail, a flank cutter IV comprising two circular knives set at an angle to each other for cutting free in the region of the belly cavity and a back or filleting cutter V consisting of at least one circular knife for cutting free on the back adjacent the backbone from the head end to the root of the tail.

The measuring devices consist firstly of a size feeler 1 which, through the intermediary of a slide 8, toothed coupling 30, intermediate levers (see Fig. 3) and spreading mechanism 32, regulates the spacing of the circular knives of the bone cutter III according to the actual relative size of the fish. In addition a time feeler 2 is provided, which, through the intermediary of a trip 15 for a locking pawl 16 of a coupling 17 with a cam 18, actuates an oscillatable belly guide 6 located within the range of the circular knives of the bone cutter III. Thus for the bone cutter III the control paths (necessary spacing of the circular knives) are determined by the size feeler 1 and the time values by the time feeler 2. The oscillatable belly guide covers the bone cutter III as long as the belly cavity moves over it. By swinging the guide 6 the bone cutter III is exposed for cutting free on the belly side adjacent the backbone from the belly cavity to the root of the tail. The time value for the adjustment of the circular knives of the bone cutter III is determined by the time feeler 2 through the intermediary of a trip 14 for the pawl 13 of a time clutch 10 with cam 11.

In addition a size feeler 3 is provided, which determines the control path of the flank cutter IV (spacing of the knives). This is effected when the feeler 3 rises, through the intermediary of a slide 9, toothed coupling 27, an intermediate lever 28 and a spreading mechanism 29. An oscillatable cutting support 7 cooperates with the flank cutter IV. The swinging of the cutting support 7 into its operative position is initiated by the fish through the intermediary of the time feeler 2 and the coupling 17 with the aid of a trip cam 19 for the retaining pawl 20 of a two speed coupling 21 which also has a cam 22 for closing the knife aperture. A yieldable guide 4 is also arranged above the flank cutter IV. As the flank cutter must only operate in the region of the belly aperture located in the part of the fish moving ahead and the height measurement of the fish decreases from the end of the belly cavity, the size feeler 3, on swinging, is utilized for closing the feeler for the cutting support 7. As the cutting support in its normal position covers the flank cutter IV and the covering operation must take place quickly at the end of the belly cavity, the cut-out is effected by a switch 37 for high speed over the two speed coupling 21 which operates through the intermediary of a double set of cams 34 with double pawls 35, 36.

The cutting out of the knives of the flank cutter IV is effected by the time feeler 2 which transmits the time value through the intermediary of a time coupling 10, a trip lever mechanism (see Fig. 3) and a time coupling 25 with a cam 26. A trip cam 12 is provided on the coupling 10 for actuating the trip lever 23.

For guiding the fish, a spike 5 is provided, onto which the fish run with their front end of the belly cavity opened by cutting off the head. The belly cutter I operates in the vicinity of the spike. The fish can be guided past the dressing tools in any known manner, but conveying means are preferably used which operate on the outer side of the fish, for example, conveyor bands engaging the fish on both sides. The conveyor bands 38 are illustrated in Fig. 2, wherein, for the sake of clearness, only the tools I to V, the feelers 1 to 4 and the conveyor bands 38 themselves, are shown. The conveyor bands are resiliently supported laterally by synchronously controlled pressure rollers 39.

The controlling means illustrated diagrammatically in Fig. 1 are shown in perspective and in detail in Fig. 3. Here the tools I and II are omitted because they have nothing to do with the control. To enable the arrangement to be better understood, all the parts are described in cooperation with each other in connection with the carrying out of the working operation.

The size feeler 1 is lifted by the fish backs running under it, the shaft 41 on which the feeler is mounted being rotated in clockwise direction (as seen in Figure 3) and the lever 42 and the push-rod 43 of the lever 44 pivotable about the bolt 45, turned in counter-clockwise direction; as a result, the cover sleeve 8 is moved downwards according to the height of the back of the fish actually passing. If the cam 11 is now rotated about its pivot 65, the pawl 49 is tripped through the intermediary of the roller 48 on the lever 46. The pawl 49 then slides on the cover sleeve 8 until it drops into engagement with the first tooth of the rack 30, whereupon the lever 50 turns about its axis 51 in counter-clockwise direction. As a result, the spreading member 32 is swung in clockwise direction through the intermediary of the lever 52, and the pull-rod 53, thereby adjusting the spacing of the circular knives III against the action of the pressure springs 56 and in accordance with the thickness of the backbone of the fish measured.

The time for this adjustment is determined by the time feeler 2 which is lifted by the fish running under it. Hereby the shaft 57 rotates in clockwise direction and swings, also in clockwise direction, the lever 60 pivoted on the bolt 61, through the intermediary of the lever 58 and push-rod 59, as well as the lever 64 pivoted on the bolt 63, through the intermediary of the push-rod 62. As a result, the coupling 10 carrying the pawl 13 is liberated by the swinging out of the locking pawl 14, and is carried along in clockwise direction by the continuously rotating shaft 65 and the cam 11 is set in rotation.

After a certain time has elapsed, the abutment lever 71 is disengaged by the pin 12 through the intermediary of the lever 66 and push-rod 68, so that the coupling 25 likewise rotates.

Simultaneously with the starting up of the coupling 10, the coupling 17 is also free to rotate. During the rotation of the cam 18 with smaller radius carried by the coupling 17, the shaft 122 is swung in clockwise direction through the intermediary of the roller 120 and lever 121, and the guide 6 is likewise swung in clockwise direction by the pull-rod 124 so that this guide no longer covers the two circular knives III which can now cut the flesh of the fish off the bones from the end of the belly cavity right up to the tail end of the fish.

The size feeler 3, which is keyed on the shaft 82, swings the lever 78 through the intermediary of the lever 81 and push-rod 80 in counter-clockwise direction as a fish passes, with the result that the cover slide 9 is pushed downwards according to the size of the fish. Under the action of the rotary cam 26, the lever 75 is raised by the roller 74 with the pawl 77. When the pawl 77 has engaged in the lowermost exposed tooth of the rack 27, this rack is lifted together with the lever 83 and the cam 87. At the same time, however, the spreader element 29 has been swung in clockwise direction and the spacing of the rib knives IV set thereby to the bone thickness of the fish actually being dressed.

The lever 28 keyed on the shaft 88 is turned in clockwise direction by the cam 85 through the intermediary of the roller 86, and consequently the cutting support 7, fixed on the other end of the shaft 88, is set to the distance from the circular knives IV according to the size of the fish.

The coupling 118 has been released from the coupling 17 by the bolts 19 fixed on the cam 18 through the intermediary of the locking levers 110 and 115, so that it can rotate in clockwise direction at half the number of revolutions of the driving shaft. If the feeler 4 drops as the end of the fish passes under it, the catch 94 linked by a bolt 95 to the lever 93 connected with the time cut-out feeler 4 by the shaft 92, while descending presses upon the lever 96 in counter-clockwise direction and moves it aside. Pivoting about the bolt 97, the lever 96 then turns by means of the bolt 98 the catch carrier 100 rotatably mounted on the bolt 99, in clockwise direction, thereby liberating the switch lever 101 loaded by the spring 104. After the switch sleeve 105 has been shifted by the lever 101, the switch sleeve 105 presses the roller lever 108, oscillatable about the axle 107, in outward direction through the intermediary of the crowned roller 106. Thus the toothed wheel gear is uncoupled so that the coupling now rotates at the speed of the driving shaft 119, lifts the lever 28 and the cutting support 7 to within a short distance below the circular knives IV by means of the cam 22 and roller 89 and consequently screens the knives from the end of the belly cavity to the end of the tail of the fish.

All the couplings 10, 17, 21 and 25 return into their initial positions by striking against stops 14, 15, 84 and 100 at the end of a revolution, so that the devices are again ready for the passing of another fish. The retraction of the switch lever 101 is effected through the intermediary of the roller 117 by means of the cam 116 as the catch lever turns back about the axle 114 in counter-clockwise direction.

I claim:

1. Apparatus for controlling the tools and guides of fish dressing machines, comprising dressing tools arranged one behind the other, conveying devices extending along all of the tools, and cooperating therewith for bringing a fish body consecutively to all of said tools, measuring devices connected with said tools for determining the control paths of the tools according to the size and shape of the fish, and measuring devices connected with said tools for timing the commencement and termination of the operation of the tools.

2. Apparatus for controlling the tools and guides on fish dressing machines, comprising dressing tools arranged one behind the other, conveying devices arranged along said tools and cooperating therewith for bringing a fish body consecutively to all of said tools, guides arranged above, in front of and between the tools and cooperating therewith, measuring devices connected with said tools and said guides for determining the control paths of the guides and tools according to the size and shape of the fish, and measuring devices connected with said tools and said guides for timing the commencement and termination of the operation of the guides and tools controlled by a part of the end of the fish lying ahead in the direction of movement.

3. Apparatus for controlling the tools and guides on fish dressing machines, comprising dressing tools arranged one following the other, conveying devices arranged along said tools and cooperating therewith for bringing a fish body consecutively to all of said tools, guides arranged above, in front of and between said tools and cooperating therewith, measuring devices connected with said tools and said guides for determining the control paths of the guides and tools according to the size and shape of the fish, and measuring devices connected with said tools and said guides and coordinated to each tool for determining the timing for the commencement and termination of the operation of the tools and guides.

4. Apparatus for controlling the tools and guides on fish dressing machines, comprising in combination dressing tools arranged one following the other, conveyor devices arranged along the tools and cooperating therewith for bringing a fish body consecutively to all of said tools, guides arranged over, in front of and between the tools and cooperating therewith, measuring devices connected with said tools and said guides for determining the control paths for the guides and tools according to the size and shape of the fish, and measuring devices connected with said tools and said guides and coordinated to a series of tools, for determining the time value for the commencement and termination of the operation of the guides and tools.

5. Apparatus for controlling the tools and guides on fish dressing machines, comprising dressing tools arranged one behind the other, conveyor devices arranged along the tools and cooperating therewith for bringing a fish body consecutively to all of said tools, guides arranged above, in front of and between the tools and cooperating therewith, combined measuring devices and guides connected with said tools for determining the control paths of the tools according to the size and shape of the fish, and combined measuring devices and guides connected with said tools for measuring the time values for the commencement and termination of the operation of the tools.

6. Apparatus for controlling the tools and guides on fish dressing machines, comprising dressing tools arranged one following the other, conveyor devices arranged along the tools and cooperating therewith for bringing a fish body consecutively to all of said tools, guides arranged above, in front of and between the tools, combined measuring devices and guides, said devices serving as guides under additional load, and connected with said tools for determining the control paths of the guides and tools according to the size and shape of the fish, and combined measuring devices and guides, the last-mentioned devices serving as guides under additional load, and connected with said tools for timing the commencement and termination of the operation of the guides and tools.

7. Apparatus for controlling the tools and guides on fish dressing machines, comprising a dressing tool, conveyor devices arranged along the tool and cooperating therewith for bringing a fish body thereto, an oscillatable guide cooperating with said tool and in position of rest covering said tool, a measuring device connected with said tool and guide for determining the control path of the tool and guide according to the size and shape of the fish, and a measuring device connected with said tool and guide for timing the commencement and termination of the operation of the tool by controlling the swinging of the guide into and out of its operative position.

References Cited in the file of this patent

UNITED STATES PATENTS

| | | |
|---|---|---|
| 2,180,303 | Baader | Nov. 14, 1939 |
| 2,683,893 | Baader | July 20, 1954 |